Dec. 5, 1933.  E. G. BEK  1,938,243
ART OF FORMING AND SOLDERING THE ENDS OF SPLIT RINGS OR LINKS
Filed June 26, 1930
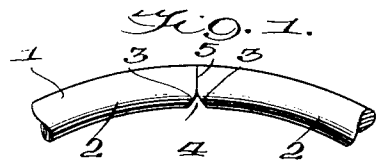
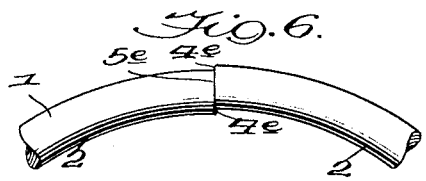
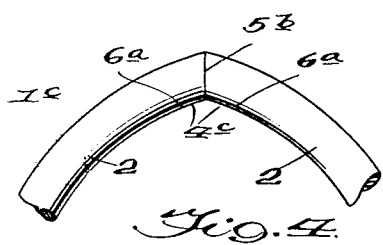
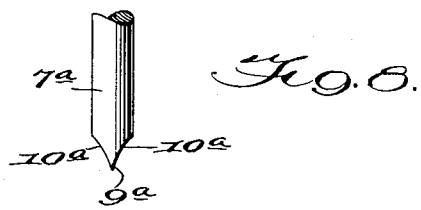
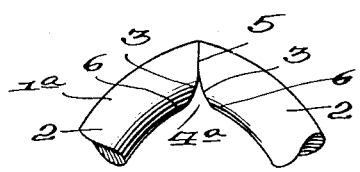
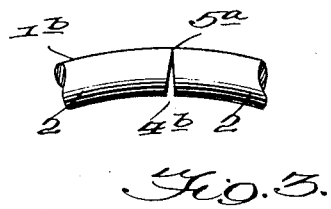
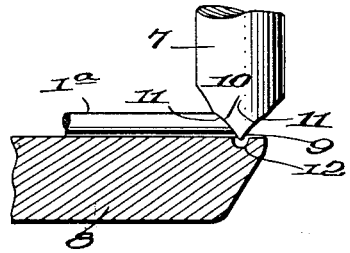
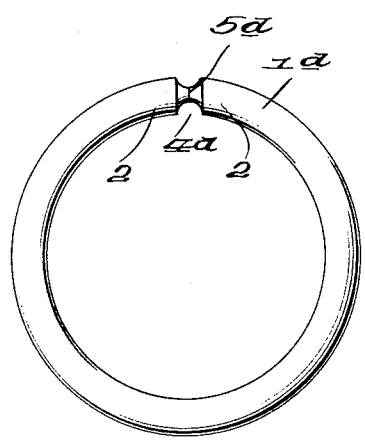
Inventor:
Ernst Gideon Bek,
By Paul E. Schilling,
Attorney.

Patented Dec. 5, 1933

1,938,243

UNITED STATES PATENT OFFICE 1,938,243

ART OF FORMING AND SOLDERING THE ENDS OF SPLIT RINGS OR LINKS

Ernst Gideon Bek, Pforzheim, Germany

Application June 26, 1930. Serial No. 464,059

10 Claims. (Cl. 59—35)

This invention relates to a method of forming and soldering the ends of links or rings of chains, wire mesh fabric and the like, and particularly to a method of soldering and closing the gaps of open rings or links of machine-made chain or mesh concatenations as they come from a link chain or mesh making machine.

Heretofore difficulties have always been encountered, both in hand soldering after manufacture of the chain or mesh concatenations, or in automatic soldering by the link or chain making machine or by a succeeding soldering machine, where solid wire in the manufacture of the rings or links is used, in preventing stiff-soldering, mis-soldering or other soldering imperfections. These difficulties have been due to the use of unsuitable soldering substances or methods, or to mechanical defects in the articles or forming machines as commonly made whereby application of the solder or its retention in place in the ring or link gaps is prevented, or to a combination of such causes. The soldering agent employed, for example, must be of such character as to readily enter the often infinitesimally small link gaps and retain its position against falling out of the link gaps in the various rubbing actions and manipulations to which the rings or links are subjected, or of being displaced by other physical or chemical causes at the time of application of heat for a soldering action. It is the usual practice to form the rings or links with spaced ends or fully open gaps, a construction necessary heretofore for the introduction of the solder charges in the soldering methods hitherto employed. This practice of itself, however, conduces to soldering irregularities, as in many cases the gaps between the ends of the links or rings vary in size, and are often of abnormal width, due to irregular feeding of the wires or to wear of machine elements. In such cases it is difficult, if not impossible, in the use of many soldering substances, to supply just the right amount of solder required to the link gaps, or to prevent the supply of too little solder to a gap, with the result that the gap when soldered will not be completely closed and a weak ring will result, or too much solder will be supplied and stiff soldering will result; and also in the use of solders of ordinary kind partial or complete loss of the solder in the link gaps before fusing may occur, with the result of imperfect soldering or no soldering at all.

The object of my invention is to overcome these difficulties first, by forming the links with completely or partly abutting ends, whereby rings which are completely closed prior to soldering may be produced, and in which a ring with a small recess in place of a complete gap is formed to receive the soldering material, whereby the amount of soldering material employed may be reduced and waste of soldering material prevented, and whereby also the ring ends may be so cut or shaped as to always provide a recess of a more or less definite size to receive the solder material, thus ensuring greater precision and certainty in supplying each ring or link with a complete charge; and, secondly, to provide a ring or link structure which will permit of the use of a soldering material which will readily enter the solder receiving recesses in the smallest sizes of rings or links and will retain its position in the recesses of rings or links of all sizes, whether such recesses are of normal size or from any cause unavoidably vary in size in rings of a given size, against any tendency to displacement until fused for the soldering action.

In the accompanying drawing I have shown certain means for carrying my method into practical effect, in which drawing:—

Fig. 1 is a fragmentary view of a ring or link showing the ends thereof as they appear before soldering and shaped to form abutment portions and a solder receiving recess.

Fig. 2 is a similar view showing a different form of ring or link and a slightly different mode of producing the abutment portions and solder receiving recess.

Fig. 3 is a similar view showing another form of the abutment surfaces of the ring ends and the solder receiving recess therebetween.

Fig. 4 is a view showing a form of ring or link in which the abutment portions are coextensive with the ends of the ring or link and the solder receiving recess is located across the joint and between the inner ring faces.

Fig. 5 is a view showing a ring or link having end abutment portions and an annular solder receiving recess bounding the same.

Fig. 6 is a view showing the formation of solder receiving recesses by radially offsetting the ring or link ends.

Fig. 7 is a view showing a cutting tool or die for shaping ring ends to produce ends of a certain form, and illustrating the action of the same in connection with an anvil.

Fig. 8 is a view showing another form of cutting tool.

The soldering material employed in the present process is preferably one of fluent character and of the consistency of paste, i.e., sufficiently thin to allow it to be applied by a rubbing or smearing action over the formed ring or chain links and into the solder receiving recesses thereof, and so as to adapt it to be drawn into said recesses by capillary attraction, and which at the same time is sufficiently thick and viscid to be self-sustaining and adapted to cling to the surfaces to which it is applied and thereby maintain its position in the ring recesses against any motions of the chains or links tending to displace it. Such a solder may be, for example, of the composition disclosed in the application of Georg Brunhubner, filed December 24, 1926, Serial No. 156,935, and consisting of a paste-like compound of a metal powder, a fluxing medium, a deoxidizing acid and a vehicle of fatty or oleaginous character, preferably an oil, the solid ingredients preferably being in very finely divided condition and such ingredients being combined to form a paste of the desired degree of fluidity and viscosity. In practice the finely divided or powdered metal may be one which will unite or alloy with the material of the wire stock, or which in itself will not constitute with the other ingredients a complete solder but which will combine during the soldering process to form with the metal of the rings a solder, or the metal constituent may constitute a fluxing agent to cause a fusion and union of the ring ends under the action of heat. The flux employed preferably comprises amorphous (red) phosphorous. This substance, during the fusing action, serves the double purpose of a deoxidizing agent and a temperature raising agent, having the property of raising the temperature to a very high degree during the fusing moment for the purpose of effecting a solder weld alloy action of the metals and to entirely consume the oil content of the solder, whereby a perfect soldering action is ensured. The deoxidizing ingredient proper may consist of boric acid, metaboric acid or pyro-boric acid in a dehydrated condition, and, under some conditions, I may also add to the solder composition an additional deoxidizing substance, such as tin phosphide powder, in order to ensure a further safeguard against oxidization in the use of some materials. All the solid ingredients are preferably employed in a finely divided state, and the purpose of the oil is to hold them in suspension and to produce a paste having the properties hereinbefore described. The oil employed may be that commonly applied to the stock and tool faces in the chain forming machine to lubricate the same, and the amount of oil employed may be that required in addition to that commonly used as a lubricant to form the amount required in the solder composition, or the total amount of oil may be contained in the solder composition. By employing in this composition dehydrated fluxes or substances, substantially free from water, any swelling of the solder material at the soldering moment due to chemical action or to the action of the heat, tending to cause displacement of the solder from the link gaps, will be effectually avoided. By the use of red phosphorous in this composition the employment of oil as a vehicle to hold the solid ingredients in suspension and to provide a solder in the form of a viscid paste is permitted, since the red phosphorous will raise the temperature during the soldering action sufficiently high to effect a complete burning up of the oil so that an efficient soldering action will be obtained, and incidentally this function of the red phosphorous obviates the labor and expense of scouring or otherwise removing the lubricating oil from the ring or link stock prior to the soldering action, which has heretofore been required in prior soldering processes. Also as this form of phosphorous is non-poisonous the paste may be handled generally, or in hand-soldering operations, without injury to the operator.

It will be understood from the foregoing that the solder paste employed need not be a complete "soldering material" in the sense that it contains a metal or combination of metals or other metals adapted to form alone or in conjunction with the metal to be joined a soldering or welding compound, as it may comprise a "solder producing material", or one in which a solder metal is omitted or the composition may be such that it will form with the metal to be soldered a solder or welding compound. This explanation is made for the reason that it is not necessary to limit the character of the soldering material in these connections, since the use of the red phosphorus provides for the raising of the temperature to such a degree as to effect either a plain soldering or a welding action. Where the term "soldering material" is employed in the claims, therefore, it is to be understood that I mean either a solder, as such, or a solder producing material or chemical welding means, as set forth.

The oil employed in this solder composition may be castor oil and a composition suitable for use under many conditions may consist of castor oil, 1 part, a metal solder powder, 3 parts, and a thinner, such as tetrachloride, 3 parts, to make a paste of desired consistency, with fluxing and deoxidizing agents of the character specified.

The links are formed in a special manner in the chain making machine to provide abutting end portions and a solder receiving recess. Some constructional examples to this end are illustrated in Figs. 1 to 6, inclusive, of the drawing. As shown in Fig. 1, a round (circular) link 1 is disclosed which has its ends 2 obliquely cut away between the circumferential center and inner periphery of the ring, as indicated at 3, to provide a substantially V-shaped solder receiving recess 4 flaring toward the inner side of the ring, the uncut portions of the ring ends between the circumferential center and outer periphery of the ring providing abutment surfaces 5 which close the split part of the ring except for the recess mentioned. By thus forming the ring a recess of a size to receive a sufficient amount of solder for a firm soldering action is produced and waste of solder prevented. Also as the surfaces 5 abut the recesses so produced in the formed rings will always be of the same definite (fixed) size to receive a precise amount or charge of solder, whereby stiff-soldering or mis-soldering will be prevented. Furthermore, the shape of the recess is such as to ensure easy and free entrance of the solder to the individual link recesses when rubbed or smeared over the surface of a link chain, and the feed of a complete charge of solder to the individual recesses is promoted and ensured by the tendency of the fluid solder to be drawn into the recess by capillary attraction. An important advantage of this ring construction and soldering method is that a solid joint is obtained with the use of a minimum amount of solder, and, as the rings are not left open but are closed at the joints before soldering, the production of rings with gaps which are liable to be too large is avoided.

Fig. 2 shows a construction similar to that of Fig. 1 except that the link 1a is of elliptical instead of circular conformation with the result that the depth of the solder receiving recess 4a is increased somewhat by the space between the adjacent converging inner surfaces 6 of the ring ends which it intersects.

Fig. 3 shows a link 1b in which the extremities of the link ends are cut away at such relative angles as to form a narrow V-shaped recess 4b which extends at its vertex to near the outer periphery of the link, where the end portions are provided with the abutting surfaces 5a.

Fig. 4 shows a construction in which the link 1c is of elliptical conformation and has abutment faces 5b coextensive in cross-section with its ends and in which a solder receiving recess disposed directly between the end faces of the ring is eliminated, a V-shaped solder receiving recess 4c being formed across the joint by the adjacent inner link surfaces 6a, corresponding substantially to the surfaces 6 shown in Fig. 2.

Fig. 5 shows a circular link 1d having the extremities of its end portions reduced to provide abutment members 5d and a surrounding solder receiving annular recess 4d which at any point about the surface of the joint is substantially V-shaped. This form of recess requires the use of a larger amount of solder than the recesses previously described, but may be used for special purposes or whenever an especially strong joint is to be made.

Fig. 6 shows a link 1e in which the abutment surfaces 5e are not reduced in area but are so disposed by radially offsetting them relatively to each other that solder receiving recesses 4e are formed at the outer and inner peripheries of the link. These are also substantially V-shaped considered with respect to planes tangential to the surfaces of the link.

Fig. 7 exemplificatively shows a means comprising a reciprocatory cutter die 7 and coacting anvil 8 which may be employed as part of a chain making machine structure for cutting and shaping the link ends. The cutter here shown has a cutting edge 9 formed by tapering faces 10 which are concaved or hollow ground and provided with shoulders 11 so arranged as to form shaping surfaces to round off a link end cut obliquely by the edge 9. The particular cutter and anvil disclosed may be suitable for shaping the ends of an inchoate link of the type illustrated generally in Figs. 1 and 2, which is rested on the upper face of the anvil and supported thereby while the cutter 7 is moved downward for a cutting and shaping action. The die has a recess 12 to permit full downward movement of the cutter and to receive the edge of the cutter at the limit of its stroke.

Fig. 8 shows another form of cutter 7a having a cutting edge 9a and concaved shaping faces 10a intersecting the lateral faces of the cutter shank, said cutter being devoid of the shoulders 11 and adapted for rounding a link end where the rounded portion is to be of less depth than the depth or thickness of the ring end.

In a machine operation the links formed and assembled in a link concatenation are supplied with the solder by suitable applying means, any excess of solder being also removed by suitable means, and the solder is fused by suitable heating means at a suitable point or points in the travel of the link concatenation, and after the soldering action is completed the chain is cleaned and otherwise suitably treated. The solder material applied may, as stated, be employed as a lubricating means between the links and working parts of the machine or lubricating oil may be employed for this purpose which is taken up as a part of the solder composition, thus avoiding any necessity of scouring the chain before the soldering action. In a hand soldering operation one or more link chains may be rubbed or smeared with the solder material so as to fill the link recesses, the links then heated to fuse the solder, and the chain or chains then cleaned, etc. The novel construction of the link ends and character of the soldering material employed permits of either automatic (machine) soldering or hand soldering so as to obviate the objections to prior methods and to effect a most reliable and efficient soldering of the links at a low cost.

Having thus fully described my invention, I claim:—

1. The method of forming and soldering the ends of split links of chains or mesh fabric, which consists in forming the link ends with abutting portions and contiguous solder recess forming portions, introducing soldering material into the solder recesses so as to bridge the joints across the abutting portions, and fusing the soldering material.

2. The method of forming and soldering the ends of split links of chains or mesh fabric, which consists in forming the link ends with abutting portions and contiguous solder recess forming portions, introducing a solder material in the form of a viscid paste into the solder recesses so as to bridge the joints across the abutting portions, and fusing the soldering material.

3. The method of forming and soldering the ends of split links of chains or mesh fabric, which consists in forming the link ends with surfaces distorted from a plane at right angles to the axis of the material forming the link with abutting portions and contiguous solder recess forming portions, rubbing or smearing a mass of chain links so formed with a viscid fluent soldering material, removing the excess soldering material from the surfaces of the links while leaving charges of the solder in the recesses of the links formed by said recess forming portions, and then fusing the solder charges.

4. The method of forming and soldering the ends of split links of chains or mesh fabric, which consists in shaping the opposed end faces of a split link diagonally with relation to the axis of the material forming the link so as to provide portions lying in contact with each other and other portions lying out of contact with each other and forming an intervening solder recess, introducing solder into such recess, and then fusing the solder.

5. The method of forming and soldering the ends of split links, which consists in forming the ends of the links with ends having surfaces diagonal to the axis of the material forming the link, parts of the surfaces of the ends being adapted to abut when the links are closed and other portions arranged to lie out of contact when the first-named portions abut so as to form intervening solder receiving recesses, interconnecting a plurality of such links, closing the links so as to cause their end abutting portions to abut, introducing solder into the solder receiving recesses of the closed links so as to bridge the joints across the abutting surfaces, and then fusing the solder.

6. The method of soldering the ends of open links or rings, which consists in forming a link or ring so as to present abutting end portions and a recess across the joint between the surfaces of the end portions, inserting solder material in said recess, and then fusing said solder material.

7. The method of soldering the ends of open links or rings, which consists in forming the ends of a split ring or link with abutting portions and intersecting angularly disposed portions forming a substantially V-shaped solder receiving recess when said abutting portions are in abutting relation, introducing solder into said recess, and then fusing the solder.

8. The method of soldering the ends of open rings or links, which consists in forming a ring or link so as to present abutting end portions and a flaring recess across the joint therebetween, inserting soldering material in said recess, and then fusing said solder material.

9. The method of soldering the ends of open rings or links which consists in forming the ring and placing the ends of the ring in contact but staggered with relation to each other so that the edge of one link is out of alinement with the end of the other link at the joint, applying solder to the shoulders or exposed ends of the links, and in fusing the said solder.

10. The method of forming and soldering the ends of a multiplicity of interengaging open links of chains or mesh fabric which consists in forming the link ends at right angles to the material forming the links with abutting portions and contiguous solder receiving recess forming portions, rubbing a mass of chain links so formed with a soldering material and stiff solder preventive, removing the excess soldering material from the surfaces of the links while leaving charges of the solder in the recesses of the links formed by said recess forming portions, and then fusing the solder charges.

ERNST GIDEON BEK.